United States Patent [19]

LaBelle et al.

[11] Patent Number: 4,692,607
[45] Date of Patent: Sep. 8, 1987

[54] CONTROLLED COLOR LIGHT SOURCE

[75] Inventors: John T. LaBelle, Long Beach; David A. Pringle, Pacific Palisades, both of Calif.; Daniel McKenna, Kahuku, Hi.

[73] Assignee: Optech Inc., Burbank, Calif.

[21] Appl. No.: 791,215

[22] Filed: Oct. 25, 1985

[51] Int. Cl.$^4$ ................................................ G01J 1/32
[52] U.S. Cl. ...................................... 250/205; 315/155
[58] Field of Search ................ 250/205; 315/155, 158, 315/307; 356/319, 402

[56] References Cited

U.S. PATENT DOCUMENTS 4,308,456 12/1981 Van Der Gaag et al. ...... 356/416 X
4,417,140 11/1983 Adolfsson et al. .................. 250/227
4,449,821 5/1984 Lee ....................................... 356/219

FOREIGN PATENT DOCUMENTS 2038695 4/1979 Fed. Rep. of Germany ...... 250/205

Primary Examiner—Eugene R. LaRoche
Assistant Examiner—David Mis

[57] ABSTRACT

A controlled color light source including a lamp for projecting a beam of light, a power supply for energizing the lamp and a light conduit for sampling a portion of the light emitted from the lamp. A beam splitter is arranged to split the light from the conduit into two channels, and a pair of photo detectors, one for each channel are arranged to receive the light from the conduit via the beam splitter. A divider circuit has a pair of inputs and an output, the inputs being connected to the two photo detectors and an output circuit is connected to the output of the divider circuit for providing an output signal which is proportional to the color of light captured by the conduit.

13 Claims, 3 Drawing Figures

CONTROLLED COLOR LIGHT SOURCE

TECHNICAL FIELD

The instant invention relates to a controlled color light source, more particularly to an electrical circuit coupled to an optical sampler for measuring the color of a light source, thereby permitting the color of a light source to be automatically and effeciently controlled.

BACKGROUND OF THE INVENTION

In the prior art, electrically powered lamps, for example, arc lamps, are commonly used to illuminate a movie scene, a theatrical set, a musical production, or the like. The lamp is typically mounted in an enclosure adjacent a reflecting mirror and may or may not have a to Fresnel lens mounted on the enclosure. Typically, the reflecting mirror and/or bulb is movably mounted so as to permit the light cast by the lamp to either "flood" a scene or merely to cast a "spot" of light or something between these two extremes.

The arc lamp used in such applications is usually rated at several hundred to tens of thousands watts and is typically energized by a power supply or ballast which in turn is connected to a conventional source of electrical power. Most ballasts and power supplies are not controllable so that the color of light produced by the arc lamp cannot be controlled directly such as by changing the power delivered to lamp. When the arc lamp is being used to illuminate a movie scene, for example, and color film is being used to shoot the movie, it is very important that the color of the light emitted by the arc lamps be properly balanced against the particular film type being used. If there is a mis-match, the scene will either appear too green or too red to the viewer of the movie. Since several lamps are generally used to illuminate a scene, it is important that all of the lamps produce the same color of light so that the scene coloring and actor's coloring does not change as the camera moves about the scene. In the prior art, the color of the light emitted by arc lamps has been controlled manually by using appropriate filters (usually of the 'gel' type) or, less frequently, by using a manually controllable power supply. The person doing the controlling either relies on his or her eye to properly adjust the color of the arc lamp, or alternatively, uses a hand held color meter, such as the commonly used Minolta meter, to test for the color of light emitted from lamp and filter combinations used to illuminate the scene then and adjusts either the filter or filters or the power suply (if controllable) as necessary to properly color balance the light with the film being used. Typically, when arc lamps are being used to illuminate the scene, the proper color balance occurs at 5600° K. color temperature.

Variations in age and conditions of the lamps result in variations in color temperature output from lamp to lamp. These variations in color make the manual task of color balancing the lamps and filters quite important since a color mismatch is quite detracting to the artistic quality of the scene. Moreover, proper color balance is difficult to keep within acceptable limits with present manual techniques. The present invention is concerned with automating the color balance of such light source.

BRIEF DESCRIPTION OF THE INVENTION

Briefly, and in general terms, the instant invention provides a controlled color light source comprising a bulb, a power supply for energizing the bulb, a suitable housing for the bulb and a color balanced control system comprising an optical conduit for sampling a portion of the light emitted by the bulb and for conveying this sampled portion away from the bulb. The sample portion is preferably split into a red and blue channel and applied to appropriate red and blue channel detectors. The output of the two detectors is preferably applied to a divider circuit for taking the ratio of the two signals and the output of the divider provides a signal which is indictative of the color temperature of the light being sampled by the optical condu9it. The output from the system is used to control the power supply energizing the bulb so as to generate a desired color temperature.

In another embodiment, the output of the system may be used to drive a meter, for example, to provide an output indication of the color temperature measured thereby in addition to or as an alternative to controlling the power supply.

DETAILED DESCRIPTION OF THE DRAWINGS

DETAILED DESCRIPTION

Figures 1, 2:
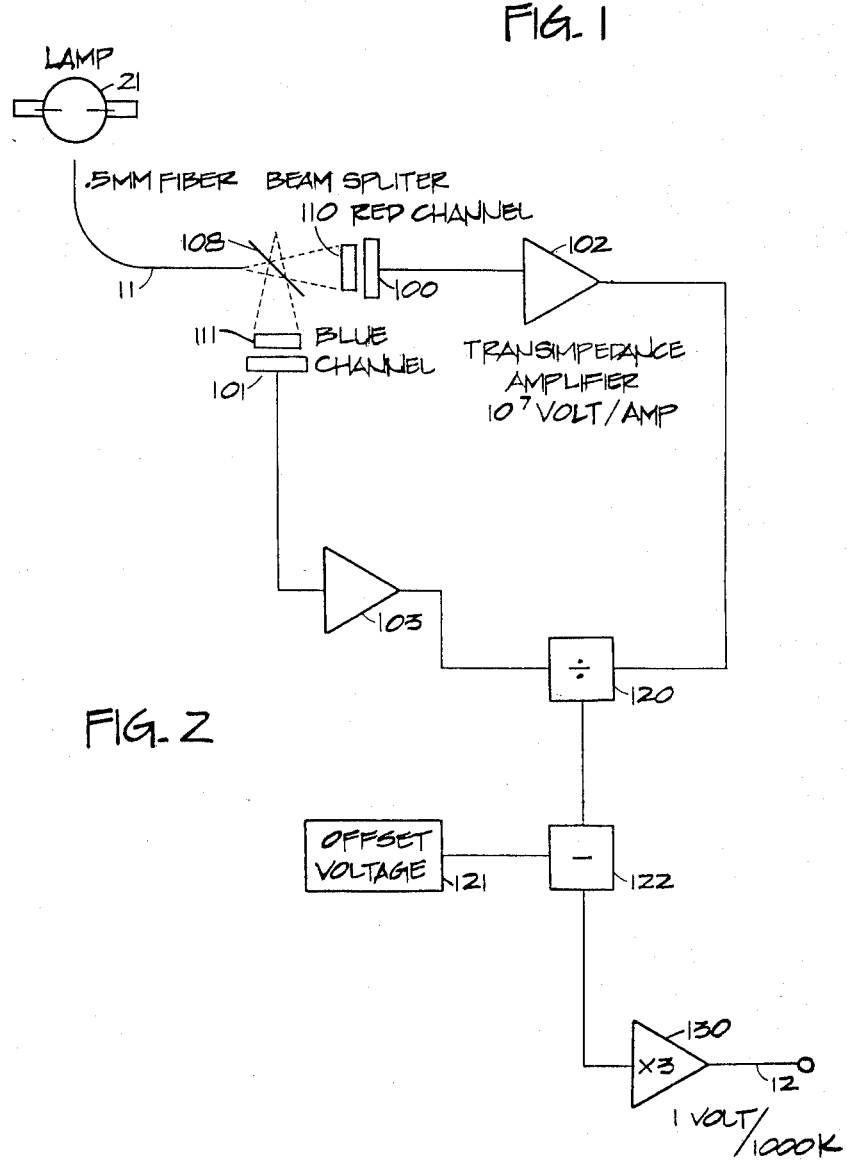
FIG. 1 is a block diagram of a controlled color light source.
FIG. 2 is a more detailed block diagram of the control system of FIG. 1.

FIG. 1 is a block diagram of a controlled color light source of the type employing the present invention. A bulb or lamp 21 is disposed within a housing 20 for projecting a beam of light through a lens 22 (when it is rotated on its axis A to cover opening 23 in housing 20). The bulb or lamp 21 and its housing 20 may be of the type commonly used to illuminate a state for the production of plays, movies and the like. The bulb or lamp 21 may be an arc lamp such as the well known HMI lamps, although those skilled in the art will appreciate that the instant invention may be used with other types of lamps as well, including quartz and incandescent lamps.

Lamp 21 is connected to a power supply 30 via conductors 32 and the power supply 30 is in turn connected to a source of conventional power by means of conductors 31.

The instant invention provides a control system for controlling the color of light produced by lamp 31. The control system preferably includes an optical fiber 11 for sampling the light produced by lamp 21, a control circuit 10 for evaluating the color of light captured in the fiber optic conduit 11 and for generating a control signal on line 12 to the power supply 30 for in turn controlling the power, voltage and/or current, as the case may be, provided to lamp 21 via conductors 32 and also thereby controlling the color of light produced by lamp 21. The signal on line 12 may also be used to drive a meter calibrated in color temperature units in addition to or in lieu of controlling power supply 30.

A more detailed block diagram of the control system is depicted in FIG. 2. Fiber optic conduit 11 has one end disposed approximately two inches from lamp 21 so as to conveniently pick up a small amount of the light produced thereby. Those skilled in the art will of course realize that lamp 21 and its reflector may be carried on a carriage (not shown) within housing 21 (FIG. 1) in order to permit the lamp to be changed from a flood to a spot type lamp. The fiber optic conduit 11 may be mounted conveniently on the carriage within the housing 20 so as to fix one of the free ends of the fiber optic conduit 11 adjacent to lamp 21 wherever it may be positioned within housing 20 on the carriage. The other end of fiber optic conduit 11 is disposed adjacent a dichroic beam splitter 108, preferably located outside the housing in a cooler environment. The beam splitter 108 is selected so that wave lengths less than 510 nm are reflected and directed to a blue channel detector 101 while wave lengths longer than 510 nm are transmitted through the beam splitter to a red channel detector 100.

Preferably, both the red and blue channel detectors 100 and 101 are provided with respective filter elements 110 and 111 which limit the wave length response of the detectors to the 300 nm to 750 nm range. The filters 110 and 111 thus band-pass the visible portion of the light conveyed by fiber optic conduit 11 to the photo detectors 100 and 101. Suitable photo detectors which included the band pass filters built in are available as model S1087 from Hamamatsu. A suitable fiber optic conduit 11 is available form Polymicro Technologies of Phoenix, Ariz. and includes a pure fused silica core clad with a doped cladding and a polymide coating and having an outside diameter of 438 micro meters. Suitable dichroic beam splitters are available from the Vacuum Coating Division of Bausch & Lomb, Rochester, N.Y.

The outputs of the detectors 100, 101 are connected to respective transimpedence amplifiers 102 and 103. The transfer function of the transimpedence amplifiers is $10^7$ volt/amp. The outputs of the transimpedence amplifiers 102, 103 are connected to the inputs of a divider circuit 120. The output of the divider is coupled to a subtractor 122 which subtracts an offset voltage from the output of the divider 120. The output from the subtractor 122 is coupled to the input of a multiplier 130.

Figure 3:
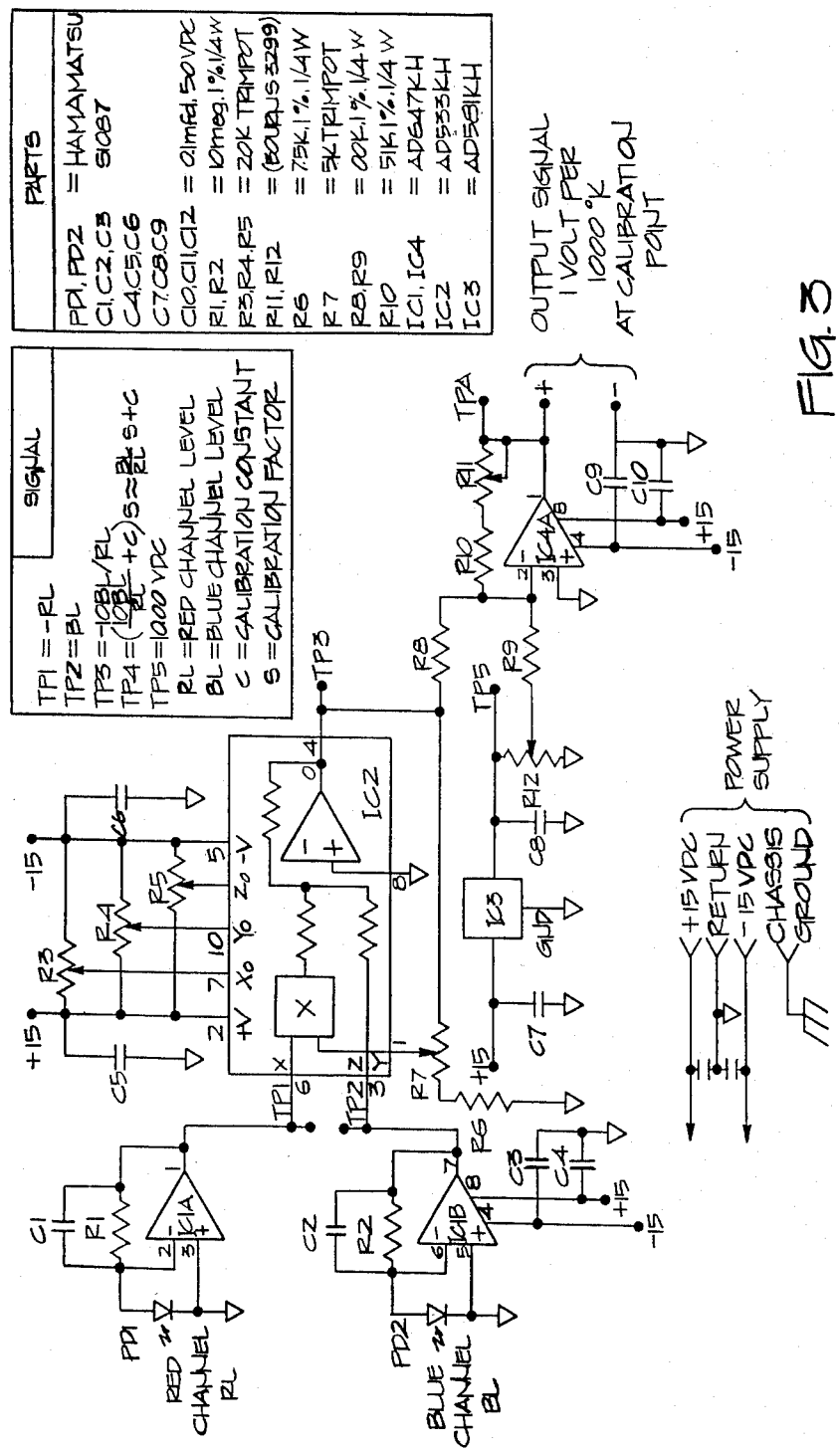
FIG. 3 is a detailed schematic diagram of the electrical portions of the control system of FIG. 2.

FIG. 3 is a detailed schematic diagram of the circuit portion of the block diagram of FIG. 2. The same reference numeral are used to represent the same general components. Those skilled in the art will appreciate that feedback paths around the various devices shown merely by block diagrams in FIG. 2 are shown in detail in FIG. 3. Indeed, the component values and type of the various resistors, integrated circuits (IC's) and the like shown are set out in Table I. Test points TP1-TP5 are depicted and the signals which are available thereat are identified in Table II.

TABLE I

| Part No. | Device |
|---|---|
| PDI,PD2 = | S1087, Hamamatsu |
| C1,C2,C3 C4,C5,C6 C7,C8,C9, C10,C11,C12 = | 0.1 microfarad, 50 VDC |
| R1,R2 = | 10 Meg,1%,¼ W |
| R3,R4,R5 = R11,R12 | 20K Trimpot (Bourns 3299) |
| R6 = | 7.5K,1%, ¼ W |
| R7 = | 5K Trimpot |
| R8,R9 = | 100K, 1%, ¼ W |
| R10 = | 151K, 1%, ¼ W |
| IC1,IC4 = | AD647KH |
| IC2 = | AD533KH |
| IC3 = | AD581KH |

TABLE II

| TEST POINT | SIGNAL AVAILABLE |
|---|---|
| TP1 = | −RL |
| TP2 = | BL |
| TP3 = | −10 BL/RL |
| TP4 = | $\frac{10BL}{RL} + CS\frac{BL}{RL} S + C$ |
| TP5 = | 10.00 VDC |
| RL = | RED CHANNEL LEVEL |
| BL = | BLUE CHANNEL LEVEL |
| C = | CALIBRATION CONSTANT |
| S = | CALIBRATION FACTOR |

The outputs from the photo detector diodes PD1 and PD2 (elements 100 and 101 in FIG. 2) are applied to transimpedience amplifiers IC1A and IC1B (elements 102 and 103 in FIG. 2). Given the transfer function of the transimpedience amplifiers, the current generated by the photo detector diodes is converted to voltages which are available at test points TP1 and TP2 what the signals indicated in Table II. IC2 (element 120 in FIG. 2) when connected in the manner identified in FIG. 3 provides a dividing function as indicated by the signal available at test point TP3. The offset voltage from block 121 of FIG. 2 is provided by IC3 and potentiometer R12 in FIG. 3 and appears as a ten volt voltage available at TP5 at the input to potentiometer R12. Potentiometer R12 delivers a portion of this ten volt voltage to the input of an operational amplifier IC4A (elements 122 and 130 of FIG. 2) whose gain is controlled by potentiometer R11. Preferably, the transfer function of IC4A should provide approximately 3× multiplication of the voltage at its input.

The output signal from the circuit at the output of operational amplifier IC4A is preferably equal to one volt per 1000° K. Color temperature at the desired calibration point. Typically, the desired calibration point would be approximately 5600° K. for arc lamps and the voltage output at that point, after the circuit has been appropriately calibrated, it is preferably 5.6 volts. For quartz lamps, the desired calibration point would is 3200° K. for an output of 3.2 V. The circuit is calibrated by adjusting R12 to adjust the 'C' calibration constant and by adjusting R11 to adjust the 'S' calibration factor (see Table II). The output signal can be used for several purposes. First, it can be used merely to drive a volt meter whose scale would be preferably calibrated in degrees kelvin color temperature. As such, the circuit of FIGS. 2 and 3 can be used as a simple, but accurate color temperature meter.

Alternatively, the circuit can be used in a feedback arrangement to control the color temperature of lamps used on a movie set, on a theatrical stage or in any other application when it is desirous to control the color temperature of lamps. Those skilled in the art will appreciate that in the movie making art, the color temperature of the lamps used to light a scene is of critical importance if a movie is being made with color film. If the color temperature of the lamps used to light the scene is not correct, than the colors appearing on the film after development will not be correct. While minor color variation may seem tolorable with respect to many objects seen in everyday life, it is quite intolerable to the viewer with respect to the color of the skin of the actors depicted in a typical movie. Thus, in order for the movie to realistically depict the scene, it is necessary that the color temperature of the lamps actually used to light the scene agree with the color temperature lamps with which the film was designed to be used. In the prior art this is typically done by using a hand held light temperature meter to measure the color temperature and, if incorrect, the lamps used to light the scene are then manually adjusted to correct the color temperature.

In accordance with the embodiment shown in FIG. 1 of the drawings, the circuit 10, whic has been described in greater detail with respect to FIGS. 2 and 3, provides an output at 12 indicative of the color of light being produced by an individual lamp. This output voltage can be used to control the power outputted by power supply 30 used to drive lamp 21 by using conventional power supply control techniques. Since controlled power supplies are well within the skill in the art, control techniques and circuits of this conventional power supply are not depicted here.

When used to control the amount of power produced by a power supply driving lamp 21, the invention provides a simple yet accurate method by which the color emitted by lamp 21 can be automatically and efficiently controlled.

Having described the invention with respect to a preferred embodiment thereof, a modification may now suggest itself to those skilled in the art. The invention itself, however, is not to be limited to this specific embodiment disclosed, except as required by the appended claims.

What is claimed is:

1. A controlled color high intensity light source comprising:
   (a) a lamp for projecting a beam of light, said lamp being installed in an enclosure, said enclosure having an opening through which said beam projects;
   (b) a power supply external of said enclosure for energizing the lamp;
   (c) a light fiber for sampling a portion of the light emitted from the lamp, said fiber having one end thereof located inside said enclosure adjacent said lamp and another end external of said enclosure;
   (d) a beam splitter arranged to split the light from the fiber into two channels;
   (e) a pair of photo detectors, one for each channel arranged to receive the light from said another end of the fiber via the beam splitter;
   (f) a divider circuit having a pair of inputs and an output, the inputs being connected to the two photo detectors;
   (g) output means connected to the output of the divider for providing an output signal which is proportional to the color of light captured by said fiber; and
   (h) means for controlling said power supply in response to said output means to automatically adjust the color of light projected by said lamp.

2. The controlled color light source of claim 1, wherein said beam splitter is a dichroic mirror wherein the first channel defines a red and wherein the second channel defines a blue channel.

3. The controlled color light source of claim 2, wherein each of said photo detectors comprises a photo diode and a transimpedience amplifier.

4. The controlled color light source of claim 3, wherein an optical band pass filter is disposed in both the red and blue channels between the beam splitter and the respective photo diodes of the red and blue channels.

5. The controlled color light source of claim 3, further comprising an offset voltage source and a subtractor circuit arranged to receive as inputs thereto, the output of the divider circuit and the offset voltage available from the offset voltage source.

6. The controlled color light source of claim 5, wherein the output of the subtractor circuit is multiplied and thence provided as the output signal to the power supply controlling same.

7. A controlled color high intensity light source comprising:
   (a) a lamp installed in an enclosure;
   (b) a power supply for energizing the lamp;
   (c) light sampling means for sampling the light emitted by the lamp, said light sampling means including a fiber optic conduit having one end thereof installed in said enclosure adjacent to said lamp and another end disposed external of said enclosure; and
   (d) means located external of said enclosure and responsive to said sampling means for measuring the color temperature of the sampled light and for adjusting the power supply to maintain a constant light color emitted by said lamp, said sampling means comprising a pair of photodetectors disposed to receive light transmitted by said conduit and exiting said another end thereof, a divider circuit having a pair of inputs and an output, the inputs of the divider circuit being coupled to the photodetectors and output means being connected to the output of the divider circuit for generating an output whose amplitude is proportional to the color of light sampled by said light sampling means.

8. A color light detector comprising:
   (a) light sampling means for sampling the light to be detected by the detector;
   (b) a pair of photodetectors arranged to receive the light from the light sampling means, each photodetector comprising a photodiode and a transimpedance amplifier;
   (c) a divider circuit having a pair of inputs and an output, the inputs of the divider circuit being connected to the two photodetectors; and
   (d) output means connected to the output of the divider circuit providing an output indication which is indicative of the color of light sampled by said light sampling means.

9. The detector of claim 8, wherein said light sampling means includes a dichroic mirror beam splitter.

10. The detector of claim 9, wherein each of said photodetectors comprises a photodiode and a transimpedence amplifier.

11. The detector of claim 10, wherein an optical band-pass filter is disposed in both of the channels between the beam spliter and the respective photodiodes.

12. The detector of claim 10, further including an offset voltage source and a subtractor circuit arranged to receive as inputs thereof, the output of the divider circuit and the offset voltage available from the offset voltage source.

13. The detector of claim 8, further including an offset voltage source and a subtractor circuit arranged to receive as inputs thereof, the output of the divider circuit and the offset voltage available from the offset voltage source.

* * * * *